US012670387B2

(12) United States Patent
    Kumar et al.

(10) Patent No.: US 12,670,387 B2
(45) Date of Patent: Jun. 30, 2026

(54) SYSTEM, METHOD, AND COMPUTER-READABLE MEDIA FOR LEAKAGE CORRECTION IN GRAPH NEURAL NETWORK BASED RECOMMENDER SYSTEMS

(71) Applicants: Ishaan Kumar, Montreal (CA);
     Yaochen Hu, Westmount (CA);
     Yingxue Zhang, Montreal (CA)

(72) Inventors: Ishaan Kumar, Montreal (CA);
     Yaochen Hu, Westmount (CA);
     Yingxue Zhang, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1072 days.

(21) Appl. No.: 17/824,556

(22) Filed: May 25, 2022

(65) Prior Publication Data

US 2022/0405588 A1      Dec. 22, 2022

Related U.S. Application Data

(60) Provisional application No. 63/193,576, filed on May 26, 2021.

(51) Int. Cl.
    *G06N 3/08*          (2023.01)
    *G06N 3/04*          (2023.01)
    (Continued)

(52) U.S. Cl.
    CPC ................. *G06N 3/08* (2013.01); *G06N 3/04* (2013.01); *G06N 3/063* (2013.01)

(58) Field of Classification Search
    CPC ........... G06N 3/08; G06N 3/04; G06N 3/063; G06N 3/048; G06N 3/09; G06N 3/084;
    (Continued)

(56) References Cited

U.S. PATENT DOCUMENTS

2019/0080383 A1    3/2019  Garcia Duran et al.
2020/0250734 A1    8/2020  Pande et al.
                   (Continued)

FOREIGN PATENT DOCUMENTS

CN        111143705 A      5/2020

OTHER PUBLICATIONS

S. Zhang, et al., Graph Embedding for Recommendation against Attribute Inference Attacks, Jan. 29, 2021, In Proceedings of the Web Conference 2021 (WWW '21), Apr. 19-23, 2021, Ljubljana, Slovenia. ACM, New York, NY, USA 13 Pages, https://arxiv.org/abs/2101.12549 (Year: 2021).*

(Continued)

*Primary Examiner* — Kakali Chaki
*Assistant Examiner* — Molly C Sippel

(57)          ABSTRACT

Systems, methods, and computer-readable media provide a graph processing system that incorporates a graph neural network (GNN) based recommender system (RS), as well as a method for training a GNN based RS to address feature leakage that leads to overfitting of the trained GNN based RS. A message correction algorithm is used to modify a user node embedding and a positive item node embedding generated by the graph neural network when generating mini batches of training triples used to train the GNN based RS. The GNN message passing operations are performed on one graph only, in contrast to existing approaches which typically run GNN message passing operations on multiple adjusted input graphs constructed for multiple training triples.

15 Claims, 5 Drawing Sheets

(51) Int. Cl.

| | |
|---|---|
| *G06N 3/0464* | (2023.01) |
| *G06N 3/048* | (2023.01) |
| *G06N 3/063* | (2023.01) |
| *G06N 3/084* | (2023.01) |
| *G06N 3/09* | (2023.01) |

(58) Field of Classification Search
CPC ...... G06N 3/0895; G06N 3/091; G06N 3/092;
G06N 3/094; G06N 3/096; G06N 3/098;
G06N 3/0985; G06N 3/0464; G06N
3/0475; G06N 3/0495; G06N 3/0499
See application file for complete search history.

(56) References Cited

U.S. PATENT DOCUMENTS

| | | | |
|---|---|---|---|
| 2021/0051121 A1 | 2/2021 | Menon et al. | |
| 2023/0206076 A1* | 6/2023 | Xu | G06N 5/02 |
| | | | 706/15 |

| | | | |
|---|---|---|---|
| 2023/0342833 A1* | 10/2023 | Wang | G06N 3/08 |
| 2024/0046075 A1* | 2/2024 | Chen | G06N 3/084 |

OTHER PUBLICATIONS

J. Zhang, et al., STAR-GCN: Stacked and Reconstructed Graph Convolutional Networks for Recommender Systems, May 27, 2019, https://arxiv.org/pdf/1905.13129 (Year: 2019).*

Liu et al., Contrastive Learning for Recommender System, Jan. 5, 2021, https://arxiv.org/abs/2101.01317 (Year: 2021).*

Sun et al., Neighbor Interaction Aware Graph Convolution Networks for Recommendation. Jan. 5, 2021. In Proceedings of the 43rd International ACM SIGIR Conference on Research and Development in Information Retrieval (SIGIR '20). https://dl.acm.org/doi/10.1145/3397271.3401123 (Year: 2021).*

Wang et al., Reinforced Negative Sampling over Knowledge Graph for Recommendation, Apr. 20, 2020, https://dl.acm.org/doi/10.1145/3366423.3380098 (Year: 2020).*

* cited by examiner

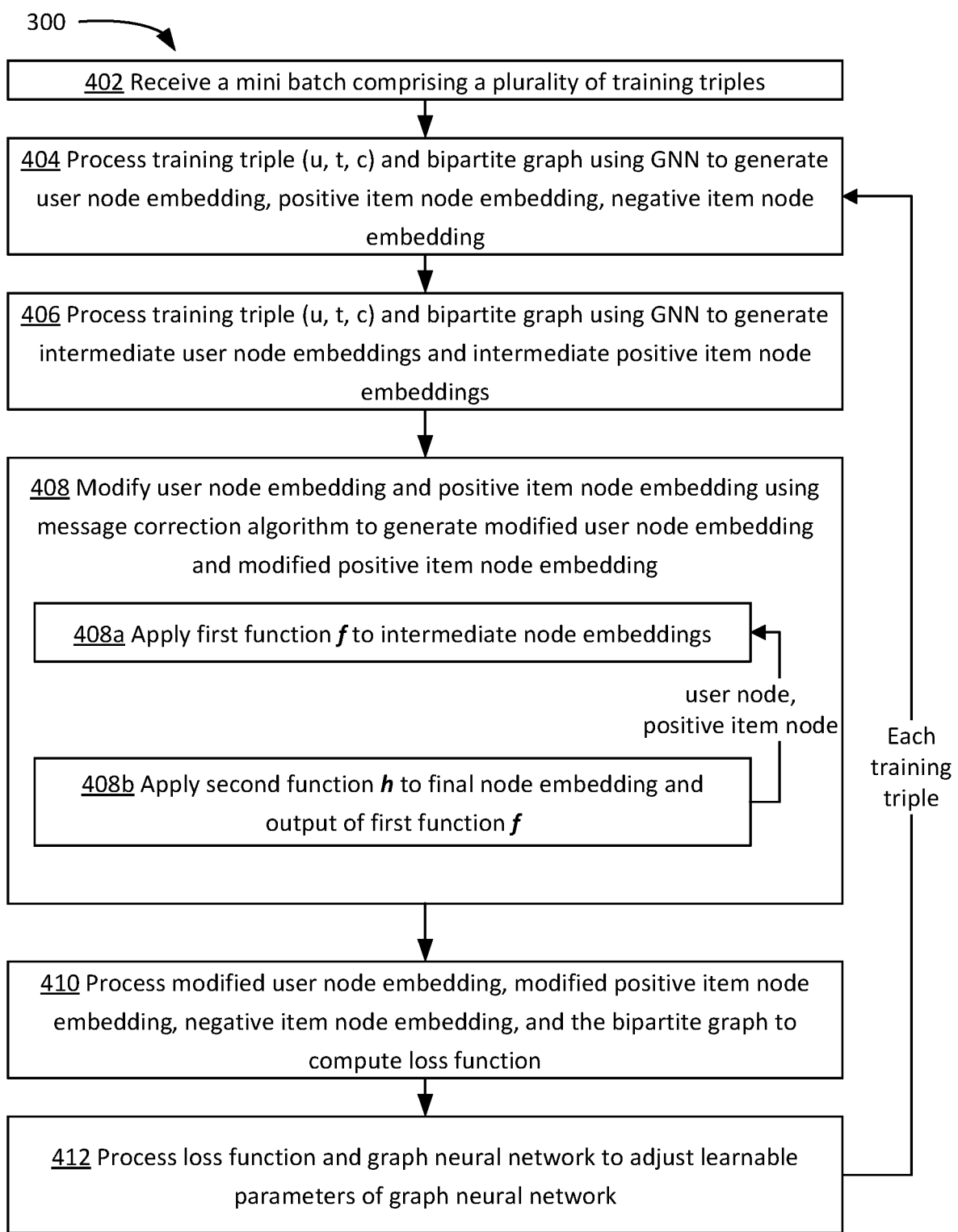

300

402 Receive a mini batch comprising a plurality of training triples

404 Process training triple (u, t, c) and bipartite graph using GNN to generate user node embedding, positive item node embedding, negative item node embedding 406 Process training triple (u, t, c) and bipartite graph using GNN to generate intermediate user node embeddings and intermediate positive item node embeddings 408 Modify user node embedding and positive item node embedding using message correction algorithm to generate modified user node embedding and modified positive item node embedding 408a Apply first function $f$ to intermediate node embeddings user node, positive item node 408b Apply second function $h$ to final node embedding and output of first function $f$ Each training triple 410 Process modified user node embedding, modified positive item node embedding, negative item node embedding, and the bipartite graph to compute loss function 412 Process loss function and graph neural network to adjust learnable parameters of graph neural network

FIG. 4

SYSTEM, METHOD, AND COMPUTER-READABLE MEDIA FOR LEAKAGE CORRECTION IN GRAPH NEURAL NETWORK BASED RECOMMENDER SYSTEMS

CROSS REFERENCE

The present application claims the benefit of priority to U.S. Provisional Patent application Ser. No. 63/193,576, entitled "SYSTEM, METHOD, AND COMPUTER-READABLE MEDIA FOR LEAKAGE CORRECTION IN GRAPH NEURAL NETWORK BASED RECOMMENDER SYSTEMS," filed May 26, 2021, the content of which is incorporated herein by reference in its entirety.

FIELD

The present disclosure generally relates to processing of graph based data using machine learning techniques, particularly in the context of recommender systems.

BACKGROUND

An information filtering system is a system that removes redundant or unwanted information from an information stream that is provided to a human user in order to manage information overload. A recommender system (RS) is a subclass of information filtering system that seeks to predict the rating or preference a user would give to an item. A RS is often used in commercial applications to guide users to find their true interests among a growing plethora of online information.

Prsonalized RSs play an important role in many online services. Accurate personalized RSs can benefit users as well as content publishers and platform providers. RSs are utilized in a variety of commercial areas to provide personalized recommendations to users, including for example: providing video or music suggestions for streaming and download content provider platforms; providing product suggestions for online retailer platforms; providing application suggestions for app store platforms; providing content suggestions for social media platforms; and suggesting news articles for mobile news applications or online news websites.

Graphs are data structures that represent real-world objects, things or people as data points (e.g., nodes) and the relationships between the nodes as a graph topology (also referred to as a graph structure). Graphs can be useful data structures for analyzing complex real-life applications such as modelling physical systems, learning molecular fingerprints, controlling traffic networks, and recommending friends in social networks. Graph neural networks (GNNs) can be used to combine node features and the graph structure to generate information about the graph through feature propagation and aggregation.

In RS, various relationships exist, such as social networks (user-user graph), commodity similarity (item-item graph), and user-item interaction (can be modeled as a user-item bipartite graph). GNNs are an emerging technique that has been demonstrated to be powerful in representation learning and for recommendation tasks. A GNN based RS integrates node features and graph structure to generate representations of users and items and then uses these representations to make recommendations.

An embedding of a graph G in a d-dimensional space S (wherein d<<the dimensionality of the nodes of G) is a mapping of G to S in which similar nodes in graph G are mapped at close proximity in the embedding space S. Each node of the graph G may be said to be embedded in space S and to have its own node embedding (also called simply an embedding) in space S.

A typical GNN based RS models the user-item interaction history as a bipartite graph and represents each user and item as a respective node in the bipartite graph. An embedding for each user node is generated by iteratively combining an embedding of the user node with embeddings of the item nodes in its local neighborhood, and the embedding for each item node is generated by iteratively combining the embedding of the item node itself with the embeddings of the user nodes in its local neighborhood. Most existing methods split this process into two steps:

1) Neighborhood aggregation, in which an aggregation function operates over sets of feature vectors to generate an aggregated neighborhood vector that is an aggregate node embedding of neighbors; and
2) Center-neighbor combination that combines the aggregated neighborhood vector (e.g. the aggregate node embedding of neighbors) with a central user/item node embedding.

A GNN based RS that uses collaborative filtering generates user and item embedding on bipartite graphs constructed from their relationships in a convolution manner by representing a node as a function of its surrounding neighborhood. For a bipartite graph, this means that a user node's embedding is generated using its own embedding and the embeddings of item nodes that the user node is connected to (where a connection represents prior interaction between the underlying user and item), and similarly an item node's embedding is generated using its own embedding and the embeddings of user nodes that the item node is connected to (where a connection represents a prior interaction between the underlying item and user).

Training a GNN based RS typically involves using a Bayesian Personalized Ranking (BPR) Loss as a loss function. The GNN based RS is trained using samples of training triples, where each training triple consists of a user, a positive item and a negative item. For each user, which is represented by a user node in a bipartite training graph, a positive item is one of the items that the user has interacted with in the past and there is an edge between the user node and the corresponding item node in the bipartite training graph that is representative of the item. This edge is referred to as a positive target edge in the training triple. Negative items may be any item that the user has never interacted with. Thus, there is no edge between the user node and an item node in the bipartite training graph that is representative of the item that the user has never interacted with. During training of the GNN based RS, training triples are sampled from the bipartite training graph. An example of sampling a training triple from the bipartite training graph includes: (1) uniformly randomly sampling a user node from the set of user nodes corresponding to the bipartite graph; (2) sampling a positive item node from the set of items nodes with which interaction with the sampled user node is observed in the bipartite training graph, and (3) sampling a negative item node from the set of items nodes with which no interaction with the sampled user node is observed in the bipartite graph.

However, training a GNN based RS using the approach described above may result in a trained GNN based RS that suffers from overfitting due to feature leakage. Feature leakage is caused by highly correlated data, e.g., training data that contains some of the information that the model is trying to predict.

Accordingly, there is need for improvements to methods of training a GNN based RS to address the problem of overfitting due to feature leakage.

SUMMARY

Systems, methods, and computer-readable media are disclosed providing a graph processing system that incorporates a graph neural network (GNN) based recommender system (RS), as well as a method for training a GNN based RS to address feature leakage that leads to overfitting of the trained GNN based RS.

Examples described herein may exhibit one or more advantages or solve one or more technical problems. Some examples may reduce the degree to which a trained GNN based RS exhibits overfitting, thereby improving the predictive accuracy of the trained GNN based RS. By improving predictive accuracy, various resources may be conserved: e.g., the GNN based RS may be trained over fewer epochs to achieve the same accuracy as existing approaches, thereby conserving computing resources such as processor cycles, memory, and power. In some examples, improved accuracy of a GNN based RS deployed to recommend products to users may reduce the chance of a product being returned or thrown away by a user because it does not suit the user's preferences. It will be appreciated that improvements in predictive accuracy can result in various beneficial effects.

In some examples, a message correction algorithm is used to modify a user node embedding and a positive item node embedding generated by the graph neural network when generating training triples used to train the GNN based RS.

Some examples may exhibit greater computational efficiency in training the GNN based RS than existing approaches due to the use of the message correction algorithm. For example, some embodiments may run GNN message passing operations on one graph only, in contrast to existing approaches which typically run GNN message passing operations on multiple adjusted input graphs constructed for multiple training triples. Furthermore, in some embodiments the message correction operation is highly parallelizable and the correction for each training triple can be performed in parallel. Each of these features may improve the efficiency of the training operation and reduce the time, power, processor cycles, and/or memory needed to train the GNN based RS.

As used herein, the term "model" may refer to a mathematical or computational model. A model may be said to be implemented, embodied, run, or executed by an algorithm, computer program, or computational structure or device. In the present example embodiments, a model may refer to a predictive model intended to model human perception or interpretation of input such as images, and may be implemented by an algorithm trained using deep learning techniques, such as a deep neural network (DNN). The terms DNN, deep neural network, neural network, artificial neural network, and network may be used interchangeably herein unless indicated otherwise.

As used herein, the term "graph neural network" or "GNN" refers to a model implemented using an artificial neural network and configured to generate predictions with respect to a graph.

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

In some aspects, the present disclosure describes a method for training a graph neural network based recommender system to make recommendations in respect of a bipartite graph. A mini batch is received, comprising a plurality of training triples. Each training triple comprises a user node of the bipartite graph, a positive item node having an edge connecting the positive item node to the user node, and a negative item node not having an edge connecting the negative item node to the user node. For each training triple, the training triple and the bipartite graph are processed to generate, using a graph neural network, a user node embedding, a positive item node embedding, and a negative item node embedding. For each training triple, a message correction algorithm is used to modify the user node embedding and the positive item node embedding generated by the graph neural network, thereby generating a modified user node embedding and a modified positive item node embedding.

In some aspects, the present disclosure describes a system comprising a processor comprising one or more processor devices, and a memory storing instructions which, when executed by the processor, cause the system to train a graph neural network based recommender system to make recommendations in respect of a bipartite graph. A mini batch is received, comprising a plurality of training triples. Each training triple comprises a user node of the bipartite graph, a positive item node having an edge connecting the positive item node to the user node, and a negative item node not having an edge connecting the negative item node to the user node. For each training triple, the training triple and the bipartite graph are processed to generate, using a graph neural network, a user node embedding, a positive item node embedding, and a negative item node embedding. For each training triple, a message correction algorithm is used to modify the user node embedding and the positive item node embedding generated by the graph neural network, thereby generating a modified user node embedding and a modified positive item node embedding.

In some aspects, the present disclosure describes a non-transitory computer-readable medium having instructions tangibly stored thereon, wherein the instructions, when executed by a processor, cause the processor to cause the system to train a graph neural network based recommender system to make recommendations in respect of a bipartite graph. A mini batch is received, comprising a plurality of training triples. Each training triple comprises a user node of the bipartite graph, a positive item node having an edge connecting the positive item node to the user node, and a negative item node not having an edge connecting the negative item node to the user node. For each training triple, the training triple and the bipartite graph are processed to generate, using a graph neural network, a user node embedding, a positive item node embedding, and a negative item node embedding. For each training triple, a message correction algorithm is used to modify the user node embedding and the positive item node embedding generated by the graph neural network, thereby generating a modified user node embedding and a modified positive item node embedding.

In some examples, the method further comprises processing the modified user node embedding, the modified positive item node embedding, the negative item node embedding, and the bipartite graph to compute a loss function.

In some examples, the method further comprises processing the loss function and the graph neural network to adjust a plurality of learnable parameters of the graph neural network.

In some examples, the message correction algorithm modifies the user node embedding and the positive item node embedding in parallel.

In some examples, the training triple is processed, using the graph neural network, to further generate one or more intermediate user node embeddings, and one or more intermediate positive item node embeddings. The message correction algorithm generates the modified user node embedding and the modified positive item node embedding based at least in part on the one or more intermediate user node embeddings and the one or more intermediate positive item node embeddings.

In some examples, the message correction algorithm generates each modified node embedding by applying a first function to the one or more intermediate node embeddings generated by the graph neural network to generate a first function output, and applying a second function to a final node embedding generated by the graph neural network and the output of the first function to generate the modified node embedding.

In some examples, the first function and second function are selected based on an architecture of the graph neural network.

In some examples, the first function is a linear combination function, and the second function is a subtraction function.

In some examples, the message correction algorithm generates the modified user node embedding and the modified positive item node embedding by correcting for feature leakage.

In some examples, the message correction algorithm generates the modified user node embedding and the modified positive item node embedding by approximating a correction for feature leakage.

In some aspects, the present disclosure describes a non-transitory computer-readable medium having instructions tangibly stored thereon, wherein the instructions, when executed by a processor, cause the processor to perform the method steps described above.

BRIEF DESCRIPTION OF THE DRAWINGS

Reference will now be made, by way of example, to the accompanying drawings which show example embodiments of the present application, and in which:

FIG. 4 is a flowchart illustrating steps of a method of training a GNN based RS according to an embodiment of the present disclosure.

Similar reference numerals may have been used in different figures to denote similar components.

DESCRIPTION OF EXAMPLE EMBODIMENTS

According to example embodiments, a graph processing system is disclosed that incorporates a graph neural network (GNN) based recommender system (RS), along with a method for training a GNN based RS to address feature leakage that leads to overfitting of the trained GNN based RS.

As noted above, a graph is a data structure which models a set of entities as nodes (V) and the relationships between entities as edges (E), such that G=(V, E). Each node (v) is data point that is defined by measured data represented as a set of node features (e.g., a multidimensional feature vector). The graph topology is defined by a set of connections (also referred to as edges) between the nodes. Each edge represents a relationship that connects two nodes. A bipartite graph is a form of graph structure in which each node belongs to one of two different node types and direct relationships (e.g., 1-hop neighbors) only exist between nodes of different types.

Figure 1:
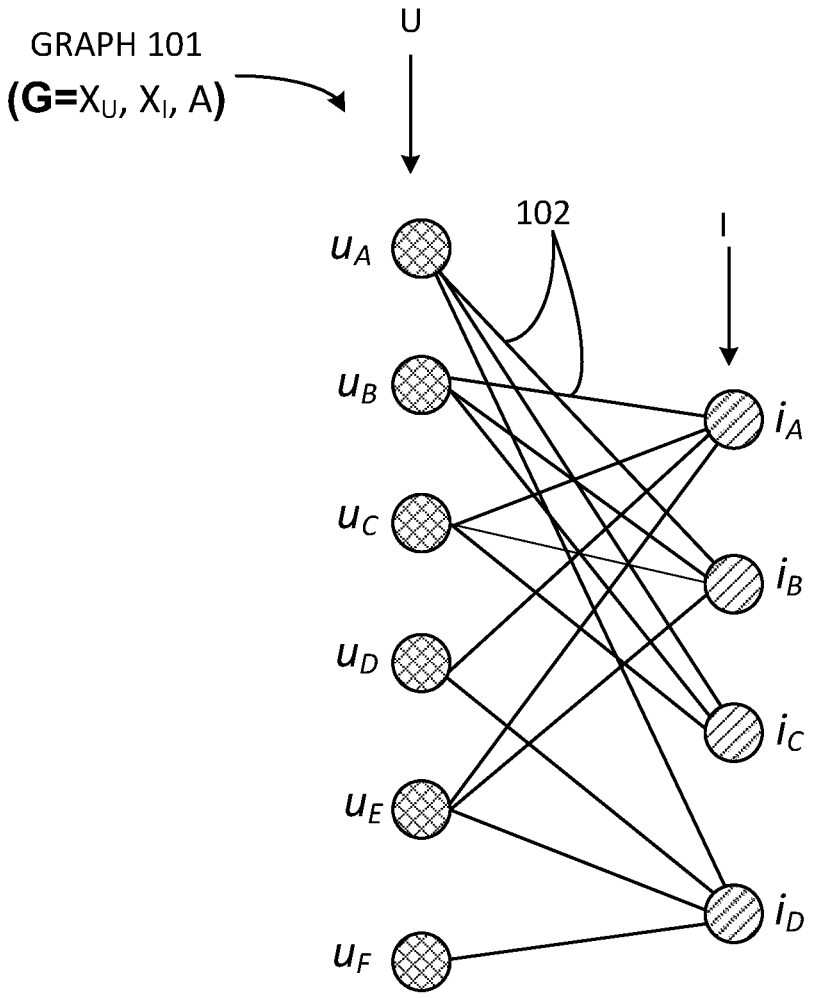
FIG. 1 is a block diagram illustrating an example of a bipartite graph, showing an environment in which embodiments of the present disclosure may operate.

FIG. 1 illustrates an example of a bipartite graph 101. A simplified representation of a sample of an observed bipartite graph 101 is shown to include two types of nodes, namely user nodes $u_A$ through $u_F$ (collectively user node set U) and item nodes $i_A$ through $i_D$ (collectively item node set I). In the present disclosure, "u" is used to refer to a generic user node or nodes and "i" is used to refer to a generic item node or nodes. Each respective user node u represents an instance of a user. Each respective item node i represents an instance of a unique item. For example, in various scenarios, items may be: audio/video media items (such as a movie or series or video) that a user can stream or download from an online video content provider; audio media items (such as a song or a podcast) that a user can stream or download from an online audio content provider; image/text media items (such as new articles, magazine articles or advertisements) that a user can be provided with by an online content provider; software applications (e.g., online apps) that a user can download or access from an online software provider such as an app store; or different physical products that a user can order for delivery or pickup from an online retailer. The examples of possible categories of items provided above is illustrative and not exhaustive.

In example embodiments, user nodes $u_A$ through $u_F$ and item nodes $i_A$ through $i_F$ are each defined by a respective set of node features. For example, each user node u is defined by a respective user node feature vector $x_u$ that specifies a set of user node features. Each user node feature numerically represents a user attribute. Examples of user attributes may for example include a user identifier (user id), age, sex, relationship status, pet ownership, etc. Collectively, user node set U can be represented as a user node feature matrix $X_U$, wherein each row in the matrix is the feature vector $x_u$ for a respective user node u. Each item node i is defined by a respective item node feature vector $x_v$ that specifies a set of item node features. Each item node i feature numerically represents an item attribute. Examples of item attributes may for example include, in the case of a movie video: an item identifier (id), movie title, director, actors, genre, country of origin, release year, period depicted, etc. Collectively, item node set I can be represented as an item node feature matrix $X_I$, wherein each row in the matrix is the feature vector $x_i$ for a respective item node i.

The edges 102 that connect user nodes u to respective item nodes i indicate relationships between the nodes. In some example embodiments, the presence or absence of an edge 102 between nodes represents the existence or absence of a predefined type of relationship between the user represented by the user node u and the item represented by the item node i. For example, the presence or absence of an edge 102 between a user node u and an item node i indicates whether or not a user has previously undertaken an action that indicates a sentiment for or interest in a particular item, such as "clicking" on a representation of the item or submitting a scaled (e.g., 1 to 5 star) or binary (e.g. "like") rating in respect of the item. For example, edges 102 can represent the click or rating history between users and items. In illustrative embodiments described below, edges 102 convey binary relationship information such that the presence of an edge indicates the presence of a defined type of relationship (e.g. a user has previously "clicked" or rated/liked an item) and the absence of an edge indicates an absence of such a relationship. However, in further embodiments edges 102 may be associated with further attributes that indicate a relationship strength (for example a number of "clicks" by a user in respect of a specific item, or the level of a rating given by a user). In some embodiments, an edge 102 may indicate that a user has purchased, ordered or otherwise consumed an item.

In example embodiments wherein edges 102 convey the presence or absence of a defined relationship, the graph topology can be represented by an adjacency matrix A that defines a matrix of binary values that indicate the presence or absence of a connecting edge between each user node u and each item node i.

Thus, bipartite graph 101 (e.g., $G=X_U$, $X_I$, A) includes information about users (e.g., user node set U, represented by user node feature matrix $X_U$), information about items (e.g., item node set I, represented by item node feature matrix $X_I$), and information about the historical interactions between users and items (represented by adjacency matrix A).

As described above, training a GNN based RS according to existing techniques typically leads to a trained GNN based RS that suffers from overfitting due to feature leakage. A method 200 of training of GNN based RS will now be described with reference to FIG. 2.

Conventional GNN Based RS Training

Figure 2:
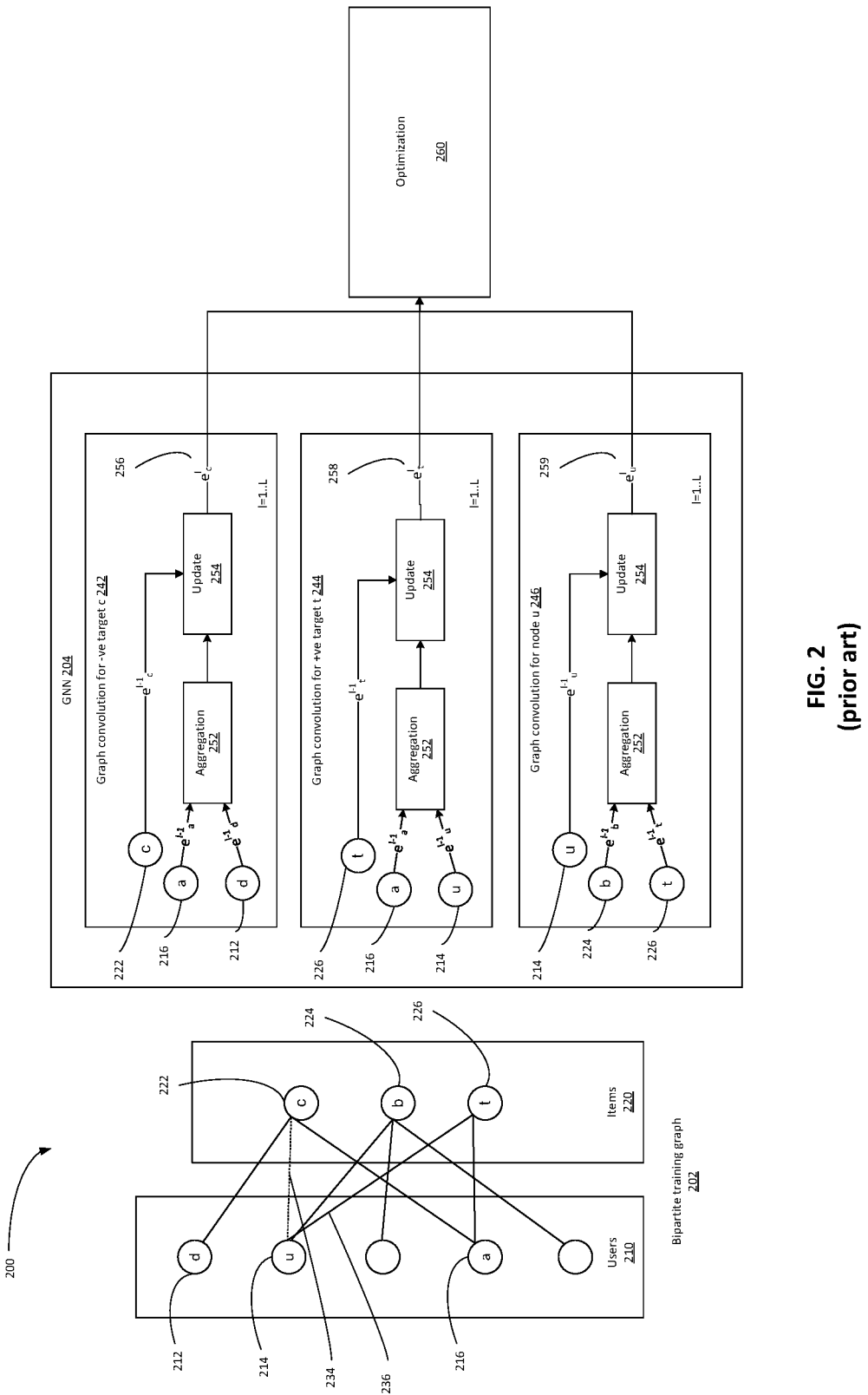
FIG. 2 (prior art) is a block diagram illustrating a prior art approach to training a GNN based RS.

FIG. 2 (prior art) shows the operations of a conventional method 200 of training of a GNN based RS for a single training triple. In some existing approaches, the GNN performs the method 200, such that the illustrated layer "l" is a layer in the range of 1 . . . L, wherein L indicates the number of layers of the GNN 204.

The method 200 begins with a training triple (u, t, c)—i.e., user node u 214, positive item node t 226, and negative item node c 222—being sampled from a bipartite training graph 202 as shown in FIG. 2. The bipartite training graph 202 shown in FIG. 2 includes a set of user nodes 210 and a set of item nodes 220. Edges are shown as solid lines between nodes. The user nodes 210 include nodes u 214, d 212, and a 216. The item nodes 220 include nodes c 222, b 224, and t 226.

The bipartite training graph 202 has an edge 236 between a user node u 214 and a positive item node t 226, shown as a solid line. The bipartite training graph 202 shown in FIG. 2 also shows a dashed line 234 extending from user node u 214 and negative item node c 222, indicating that the item node c 222 is a negative item, i.e., there is no edge between user node u 214 and item node c 222 in the bipartite training graph 202. The GNN 204 receives the sampled training triple (u, t, c) and the bipartite training graph 202. The GNN 204 generates a user node embedding $e^l_u$ 259, a positive node embedding $e^l_t$ 258, and a negative node embedding $e^l_c$ 256 for the user node u 214, the positive item node t 226, and the negative item node c 222 included in the sampled training triple (u, t, c). The method 200 then computes a BPR loss value for the generated user node embedding 259, positive item node embedding 258, and negative item node embedding 256 and updates the values of the parameters of the GNN 204 using a gradient update operation. A back-propagation algorithm is used to compute the gradient of the parameters of the GNN 204 with reference to the computed BPR loss value. Further iterations of the method 200 are performed on different training triples until the values of the parameters of the GNN 204 are optimized. Thus, optimization operation 260 shown in FIG. 2 may minimize, with respect to the learnable parameters θ of the GNN 204, the sigmoid function σ, as follows:

$$\text{minimize}_\theta - \sum\nolimits_{(u,t,c)} \sigma\left(e^L_u \cdot e^L_t - e^L_u \cdot e^L_c\right)$$

The GNN 204 generates a user node embedding 259, a positive item node embedding 258, and a negative node embedding 256, for the user node 214, the positive item node 226, and the negative item node 222 in a sampled training triple respectively, by performing local neighborhood aggregation (shown as aggregation operation 252) in the graph domain using a message passing process. The user node embedding 259 is generated by user node graph convolution 246; the positive item node embedding 258 is generated by positive item node graph convolution 244; and the negative item node embedding 256 is generated by negative item node graph convolution 242. A message passing process involves pushing messages (otherwise referred to as embeddings) from surrounding nodes around a given reference node, through edges. For a given graph G=(V,E,X), assume:

V={$v_1$, $v_2$, . . . , $v_N$} is a set of N nodes.

E is a set of edges describing relationship between nodes.

$A \in \{0, 1\}^{N \times N}$ is an adjacency matrix where $A_{ij}=1$ in indicates the presence of a link (e.g. an edge) between nodes $v_i$ and $v_j$, otherwise $A_{ij}=0$.

X={$x_1$, $x_2$, . . . , $x_N$} $\in \mathbb{R}^{d \times N}$ is a matrix that includes vectors of node features, where features of each node can be categorical (e.g. gender for person represented by the node), continuous (e.g. age of a person), or textual (e.g. description of document). $x_i \in \mathbb{R}^d$ denotes a vector of the node features of a node $v_i$.

Y={$y_1$, $y_2$, . . . , $y_N$} $\in \mathbb{R}^{1 \times N}$ is a vector of node labels.

The initial embedding of each node v (referred to as node embedding) is given by its feature vector, $$e^0_v = x_v.$$

At each message passing layer, each node receives the set of node embeddings from its neighbor nodes. The received embeddings are fed to an AGGREGATE function 252 (e.g. average neighbor messages) which outputs a message $m_{N(v)}$. Then an UPDATE function 254 is used to combine the aggregated neighborhood embedding with its own node embedding to produce a new embedding for each node, i.e. update $$e_v^{l-1} \text{ to } e_v^l.$$

This new embedding contains feature information from both the node and its neighbors. After running K layers of the GNN message passing technique, the final embedding for each node is obtained, $$e_v = h_v^K.$$

With each layer of message passing, a node learns more and more about its neighborhood features and its distant neighbor's features as well.

To provide an example, the AGGREGATE and UPDATE functions can be defined as:

$$\text{AGGREGATE} = m_{N(v)}^k = \sum_{u \in N(v)} \frac{e_u^{k-1}}{|N(v)|}$$

$$\text{UPDATE}(e_v^k, m_{N(v)}^k) = \sigma\left(W_{self} e_v^{k-1} + W_{neighborhood} m_{N(v)}^k\right)$$

Combining the above two equations, the node embedding at the kth layer of the message passing technique can be obtained as:

$$e_v^k = \sigma\left(W_{self} e_v^{k-1} + W_{neighborhood} \sum_{u \in N(v)} \frac{e_u^{k-1}}{|N(v)|}\right), \forall k > 0$$

wherein $$e_v^k$$

denotes the node embedding of node v at the kth layer, and σ denotes an element-wise non-linear activation function (e.g., ReLU, tanh or sigmoid).

$$\sum_{u \in N(v)} \frac{e_u^{k-1}}{|N(v)|}$$

computes an average of the neighbors' embedding at the previous message passing layer, and $$e_v^{k-1}$$

denotes the node embedding of v at the previous message passing layer. The activation function is a non-linear function that determines a range of embedding values (i.e., node feature values). $W_{self}$ and $W_{neighborhood}$ are learnable parameters of the GNN.

Typical AGGREGATE functions are sum, average, MLP, or LSTM. Typical UPDATE functions are made of operations such as sum, difference, multiplication, division, concatenation, or MLP followed by a non-linear activation function. The non-linear activation function is optional in the UPDATE function.

In a GNN based RS, the edges in a training bipartite graph 202 play two roles simultaneously: an indicator of the set of positive item nodes from where positive item node in a training triple is going to be sampled from, and determining the neighbors of nodes for the message passing procedure. When not properly handled during the training of the GNN based RS, the aggregation of a user node's neighbor nodes will contain information associated with the positive item node that in included in a training triple, which might act as a proxy for the positive target edge. However, in a testing phase, a positive target edge never appears in the message passing procedure. This gives rise to feature leakage and leads to overfitting, degrading the performance of the trained GNN based RS during inference.

A simple correction approach, which may be used to avoid feature leakage, involves, for each training triple, excluding the positive target edge (e.g., edge 236) for the message passing procedure. However, it is challenging to efficiently implement excluding the positive target edge for the message passing procedure. A naïve algorithm may be used to exclude the positive target edge for the message passing procedure. The naïve algorithm, for each training triple, constructs a copy of the training bipartite graph 202 that does not contain a positive target edge 236 and the layers of the message passing process are carried over to this copy of the training bipartite graph 202. Since this has to be done for each training triple, the naïve algorithm is not computationally efficient, as it requires a significant amount of memory and computational overhead to execute.

The present disclosure provides a method of training a GNN based RS that addresses the feature leakage problem in a computationally efficient manner.

GNN Based RS Training with Leakage Correction

Figure 3:
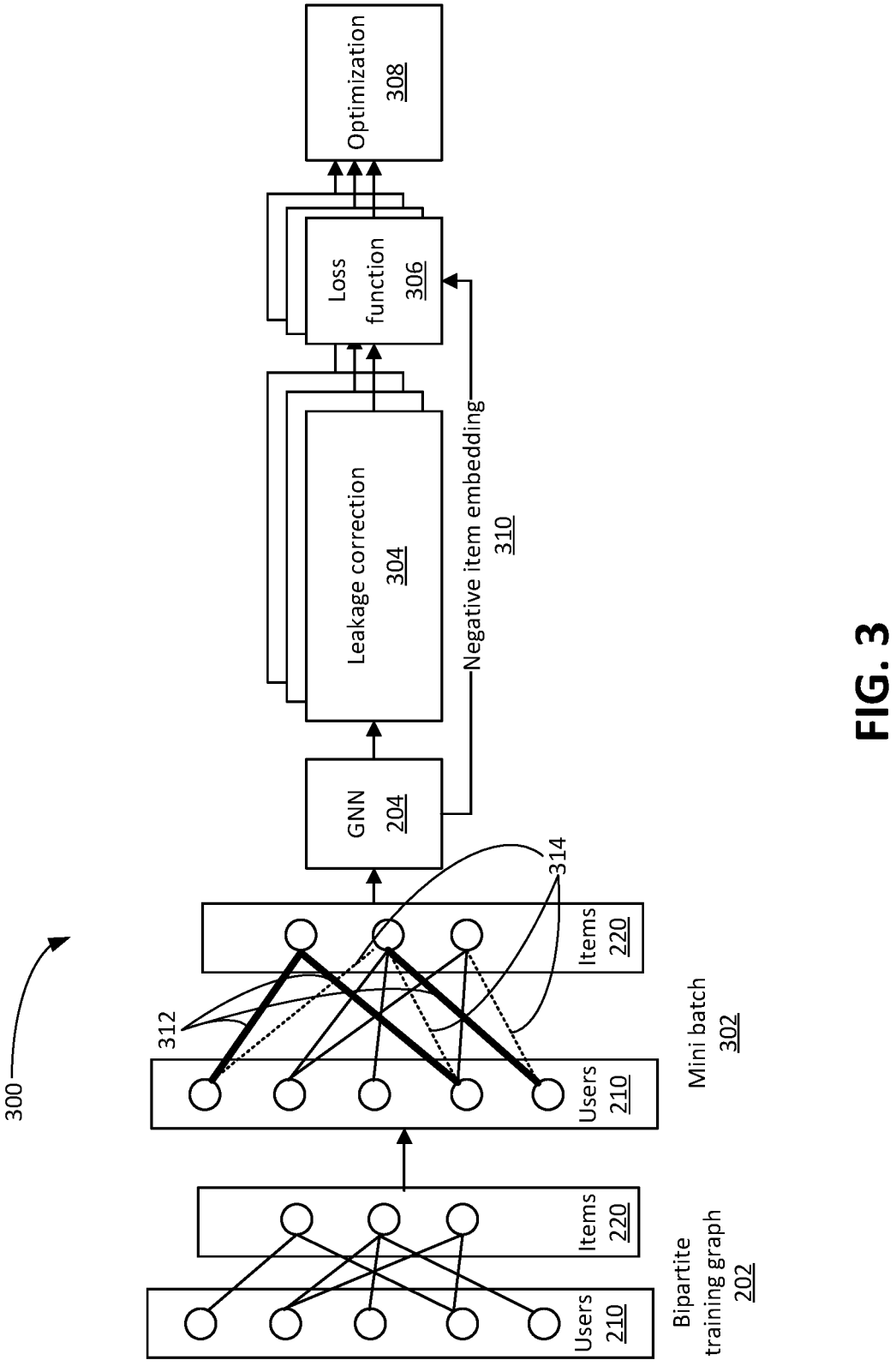
FIG. 3 is a block diagram illustrating operations for training a GNN based RS according to an embodiment of the present disclosure.

FIG. 3 is a block diagram illustrating the operations of a method 300 of training a GNN based RS according to the present disclosure. The method 300 generates a corrected version of a user node embedding and a negative item node embedding for a training triple input to the GNN based RS. One iteration of the method 300 will now be described.

The method 300 begins with a mini batch 302 of training triples sampled from the bipartite training graph 202. The training triples of the mini batch 302 are shown in FIG. 3 as three training triples: each includes a user node selected from the user nodes 210 (namely, the first, fourth, and fifth user nodes), a positive item node relative to the user node (namely, the item nodes connected to each sampled user node by bold solid lines 312), and a negative item node relative to the user node (namely, the item nodes connected to each sampled user node by dashed lines 314, indicating the absence of an edge between those nodes).

The mini batch 302 of training triples, together with the bipartite training graph 202, are provided to the GNN 204. The GNN 204 generates, for each training triple in the mini batch 302, a user node embedding, a positive item node embedding, and a negative item node embedding 310.

The method 300 then applies a leakage correction operation 304. A message passing process is performed to evaluate the user node embedding, positive item node embedding, and negative item node embedding generated by each of the k layers of the GNN 204. The leakage correction operation 304 computes a corrected user node embedding and a corrected positive item node embedding for each training triple in the mini batch, while the original negative item embedding 310 generated by the GNN 204 is passed from the GNN 204 to the operations downstream from the leakage correction operation 304 unchanged. Specifically, at the leakage correction operation 304, the contribution to the node embeddings from positive target edges are evaluated, and the final correct embeddings are adjusted by subtracting that part from the original node embeddings. The steps of the leakage correction operation 304 are described below.

For each training triple, a message correction algorithm is performed for the user node and the positive item node. The negative node embedding 310 is not modified.

A given positive edge 312 is denoted (u, t) wherein u is the user node, t is the positive item node, $$e_u^k$$

is the final node embedding for node u, $$e_t^k$$

is the final node embedding for positive item node t.

$$e_u^k \text{ and } e_t^k$$

are modified to produce modified node embeddings $$\hat{e}_u^k \text{ and } \hat{e}_t^k$$

for the training triple using two functions h & $f$, and the intermediate node embeddings are stored. Functions h & $f$ can be linear, non-linear, iterative, etc., and the functions h & $f$ use the stored intermediate embeddings of the two nodes along with the final node embeddings to compute the corrected node embedding that doesn't contain the messages due to the presence of positive target edges. Specifically, $$\hat{e}_u^k = h\!\left(e_u^k, f\!\left(e_u^0, e_u^1, \dots, e_u^{k-1}, e_t^0, e_t^1, \dots, e_t^{k-1}\right)\right)$$
$$\hat{e}_t^k = h\!\left(e_t^k, f\!\left(e_t^0, e_t^1, \dots, e_t^{k-1}, e_u^0, e_u^1, \dots, e_u^{k-1}\right)\right)$$

The choice of the functions h & $f$ may be dictated by the choice of architecture of the GNN 204. For example, for a LightGCN model, function h is a simple subtraction operation and function $f$ is a linear combination of its input arguments, such that the above equations become:

$$\hat{e}_u^k = e_u^k - \left(\alpha_1 e_t^0 + \alpha_2 e_t^1 + \dots + \alpha_{k-1} e_t^{k-1}\right)$$
$$\hat{e}_t^k = e_t^k - \left(\alpha_1 e_u^0 + \alpha_2 e_u^1 + \dots + \alpha_{k-1} e_u^{k-1}\right)$$

wherein the weights $\alpha_i$ are a detail specific to the architecture of LightGCN model and are specified herein for correctness.

It will be appreciated that for some architectures and settings (such as some values for layer number) it may not be possible to compute the correct modified embeddings $$\hat{e}_u^k \text{ and } \hat{e}_t^k$$

efficiently. In some such examples, it may nonetheless be possible to efficiently compute an approximate correction and mitigate the effect of label leakage.

For example, in the above specified correction for LightGCN, the computed $$\hat{e}_u^k \text{ and } \hat{e}_t^k$$

are approximate when the number of layers (i.e. k) is greater than 2. However, the correction is exact (i.e. accurately matches the output of the naive algorithm and completely removes label leakage) when the number of layers k is less than or equal to 2.

For each training triple, the corrected final node embeddings $$\hat{e}_u^k \text{ and } \hat{e}_t^k$$

are used to compute the downstream loss function 306. For negative item(s) either $$\hat{e}_u^k \text{ and } e_i^k \text{ or } e_u^k \text{ and } e_i^k$$

can be used as the negative item node embedding 310. An optimization operation 308 may be performed based on the computed loss function 306; in some embodiments, the optimization operation 308 may be substantially the same as the optimization operation 260 of method 200.

Method 300 may exhibit one or more advantages over existing techniques such as method 200 or the naïve correction techniques described above. In some examples, the messaging passing process of the leakage correction operation 306 is performed on only one bipartite training graph 202, and the corrected user node embedding, corrected positive item node embedding, and negative item node embedding 310 are only based on the intermediate results of that message passing process. In contrast, the naïve correction technique described above requires the use of multiple alternative bipartite graphs, one for each training triple. Thus, in some examples the method 300 requires less memory and is more computationally efficient than the naïve correction approach described above. Furthermore, message correction in method 300 is highly parallelizable and the modification of the user node embedding and the positive item node embedding generated for each training triple can be performed in parallel.

FIG. 4 is a flowchart showing the order of steps of the example method 300 for efficiently training the graph neural network based recommender system with feature leakage correction. Method 300 trains the graph neural network based recommender system to make recommendations in respect of the bipartite graph 202.

Method 300 begins at 402. At 402, the mini batch 302 is received, including a plurality of training triples, as described above with reference to FIG. 3.

Steps 404 through 412 are performed for each training triple (u, t, c) in the mini batch 302. Steps 404 through 412 use only a single bipartite graph 202, in contrast to the naïve correction technique described above, which uses a distinct bipartite graph for each training triple.

At 404, the training triple and the bipartite graph are processed by the GNN 204 to generate a user node embedding $$e_{u'}^k$$

a positive item node embedding $$e_t^k;$$

and a negative item node embedding $$e_c^k$$

310.

Optionally, at 406, in the course of generating the final node embeddings at 404, the GNN 204 also generates one or more intermediate node embeddings for the user node, i.e., $$e_u^0 \text{ through } e_u^{k-1},$$

and one or more intermediate node embeddings for the positive item node, i.e., $$e_t^0 \text{ through } e_t^{k-1}.$$

At 408, a message correction algorithm is used to modify the user node embedding and the positive item node embedding generated by the graph neural network, thereby generating a modified user node embedding $$\hat{e}_u^k$$

and a modified positive item node embedding $$\hat{e}_t^k.$$

In some embodiments, step 408 includes sub-steps 408*a* and 408*b* for each of the user node and the positive item node.

At 408*a*, a first function f (such as a linear combination function) is applied to the one or more intermediate node embeddings (e.g., $$e_u^0 \text{ through } e_u^{k-1})$$

to generate a first function output.

At 408*b*, a second function h is applied to the final node embedding (e.g., $$e_0^k)$$

and the output of the first function f to generate the modified node embedding (e.g., $$\hat{e}_u^k).$$

In some embodiments, step 408 generates the modified node embeddings by applying an exact correction for feature leakage. In other embodiments or examples, such as some examples in which the number of GNN 204 layers is high (e.g., k is greater than 2), step 408 may generate the modified node embeddings by applying an approximate correction for feature leakage.

At 410, the modified user node embedding, the modified positive item node embedding, the negative item node embedding 310, and the bipartite graph 202 are processed to compute a loss function at loss function operation 306.

At 412, the loss function and the graph neural network 204 are processed at the optimization operation 308 to adjust a plurality of learnable parameters of the graph neural network 204, e.g., using backpropagation and gradient descent or another parameter optimization technique.

In some examples, the order of steps may be changed or steps may be performed in parallel or in alternation. For example, the modification of the user node embedding and the modification of the positive item node embedding may be performed in parallel, or the processing of the training triples at one or more of steps 404 through 412 may be performed in parallel or in alternation.

Processing System

Figure 5:
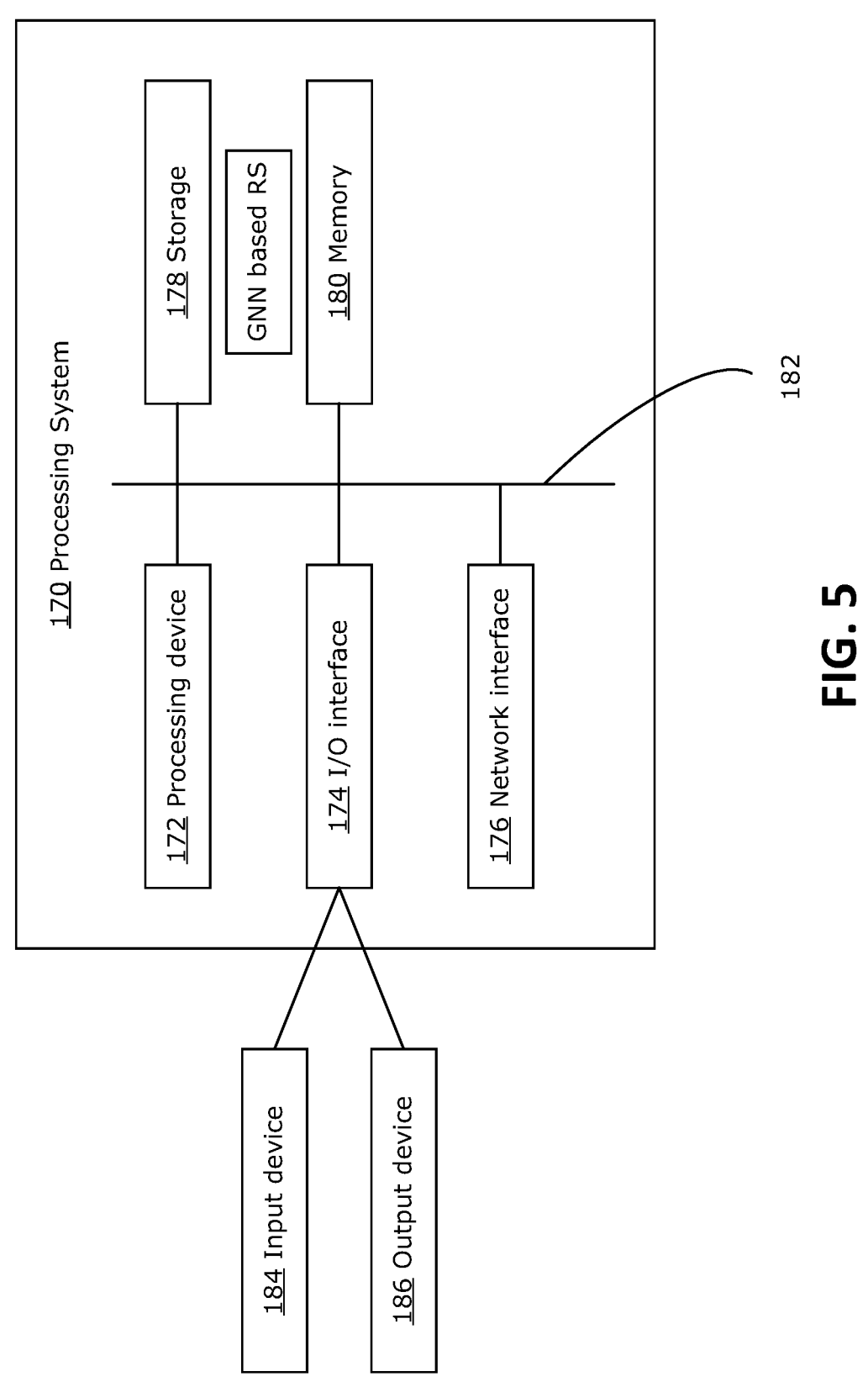
FIG. 5 is a block diagram illustrating an example processing system that may be used to execute machine readable instructions to implement the GNN based RS of the present disclosure.

FIG. 5 is a block diagram of an example processing system 170, which may be used to execute machine executable instructions of a GNN based RS for performing method 300 of the present disclosure. Other processing systems suitable for implementing embodiments described in the present disclosure may be used, which may include components different from those discussed below. Although FIG. 5 shows a single instance of each component, there may be multiple instances of each component in the processing system 170.

The processing system 170 may include one or more processing devices 172, such as a processor, a microprocessor, a central processing unit (CPU), a neural processing unit (NPU), a tensor processing unit (TPU), an application-specific integrated circuit (ASIC), a field-programmable gate array (FPGA), a dedicated logic circuitry, or combinations thereof. The processing system 170 may also include one or more input/output (I/O) interfaces 174, which may enable interfacing with one or more appropriate input devices 184 and/or output devices 186. The processing system 170 may include one or more network interfaces 176 for wired or wireless communication with a network.

The processing system 170 may also include one or more storage units 178, which may include a mass storage unit such as a solid state drive, a hard disk drive, a magnetic disk drive and/or an optical disk drive. The processing system 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing system 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Detailed Example Message Correction Algorithm

A detailed example implementation of the message correction algorithm used to perform the leakage correction operation 304 will now be described. The detailed example message correction algorithm uses a LightGCN model as the GNN 204. The message correction algorithm may be characterized as follows for a K-layer LightGCN model (i.e. GNN 204).

The training process as a whole performs an accurate removal operation, which evaluates the embedding of nodes for each edge over a separate graph with that specific edge removed. The message correction algorithm seeks to conduct the accurate removal method with similar computation complexity to the original LightGCN model. The message correction algorithm is used to determine the relation of the node embeddings from the conventional LightGCN approach and those after the accurate removal operation. The message correction algorithm is intended to function as a quick transformation algorithm based on the embeddings $E^{(k)}$, $\forall k$ generated by the conventional LightGCN approach. Specifically, for each training triple (u, t, n), the final embedding is evaluated based on the graph $\mathcal{G}\_(u, t)$. The use of the accent ´ over the existing variables to denote the version under the graph $\mathcal{G}$ (u, t). The message correction algorithm seeks to compute $$\hat{e}_z = \frac{1}{K+1} \sum_{k=0}^{K} \hat{A}_{z,*}^k E^{(0)},$$

for $z \in \{u, t\}$. As for the negative item node n, the final embedding $e_n$ (i.e., negative item node embedding 310) generated by the conventional LightGCN approach is used, as shown in FIG. 3. In summary, the purpose of the message correction algorithm is to evaluate $$\hat{A}_{z,*}^k E^{(0)}$$

for $\forall k$ based on $$\hat{A}_{z,*}^k E^{(0)}$$

for $\forall k$.

First, the relation between $$\hat{A}_{z,*}^k E^{(0)} \text{ and } A_{z,*}^k E^{(0)}$$

is derived. It will be appreciated that, in conventional LightGCN:

$$A_{z,*}^k E^{(0)} = A_{z,*} A^{k-1} E^{(0)} = \sum_{i \in N(z)} A_{z,i} A_{i,*}^{k-1} E^{(0)} \tag{3}$$

$$= \sum_{i \in N(z)} A_{zi} \sum_{j \in N(i)} A_{ij} A_{j,*}^{k-2} E^{(0)}, \tag{4}$$

wherein Equation (4) is achieved by applying Equation (3) twice. Similarly, for an accurate removal approach:

$$\hat{A}_{z,*}^k E^{(0)} = \sum_{i \in \hat{N}(z)} \hat{A}_{zi} \sum_{i \in \hat{N}(i)} \hat{A}_{ij} \hat{A}_{j,*}^{k-2} E^{(0)}. \tag{5}$$

Another fact is the relation between A and Á, $$\hat{A}_{ij} = \begin{cases} A_{ij} & \text{if } i \neq u, j \neq t \\ |N(u)|/|\hat{N}(u)| A_{ij} & \text{if } i = u, j \neq t \\ |N(t)|/|\hat{N}(t)| A_{ij} & \text{if } i \neq u, j = t \\ 0 & \text{if } i = u, j = t \end{cases} \tag{6}$$

Combining Equations (4), (5) and (6) and subtracting a weighted Equation (5) from (4), yields:

$$A_{z,*}^k E^{(0)} - |\hat{N}(z)|/|N(z)| \hat{A}_{z,*}^k E^{(0)} = A_{z\bar{z}} A_{z,*}^{k-1} E^{(0)} + \Delta_z^k, \tag{7}$$

where $$\Delta_z^k = \sum_{i \in \hat{N}(z)} A_{zi} \underbrace{\left( \sum_{j \in \hat{N}(i)} A_{ij} \left( A_{j,*}^{k-2} - \hat{A}_{j,*}^{k-2} \right) + A_{iz} A_{z,*}^{k-2} - \hat{A}_{iz} \hat{A}_{z,*}^{k-2} \right)}_{P_1} E^{(0)}, \tag{8}$$

and $\bar{z}$ denotes the other end points on the edge (u, t) from z. To simplify the computation, an approximated version of $$\tilde{\Delta}_z^k$$

is generated by ignoring $P_1$ in Equation (8), yielding:

$$\tilde{\Delta}_z^k = A_{z,*}^{k-2} E^{(0)} \cdot \sum_{i \in \hat{N}(z)} A_{zi}^2 - \hat{A}_{z,*}^{k-2} E^{(0)} \cdot |\hat{N}(z)|/|N(z)| \sum_{i \in \hat{N}(z)} \hat{A}_{zi}^2. \tag{9}$$

It can be verified that when k=0, 1, $$k = 0, 1, \Delta_z^k = 0,$$

thereby defining $$\tilde{\Delta}_z^k = 0$$

for k=0,1. Equations (7) and (9) provide a way to represent $$\hat{A}_{z,*}^k E^{(0)}$$

by $$\hat{A}_{z,*}^k E^{(0)} \text{ and } \hat{A}_{z,*}^{k-2} E^{(0)},$$

thereby allowing an efficient algorithm to compute $$\hat{A}_{z,*}^k E^{(0)}$$

for $\forall$k via dynamic programming.

Due to the approximation in Equation (9), the results from the algorithm are equivalent to the accurate removal method only under the condition that the number of layers of the GNN model 204 K≤2. For more layers, error could be further reduced by expanding Equations (4) and (5) to more layers and deriving the relations with a similar procedure. However, more layers will introduce more computation complexity. The implementation described in this section may be adopted in some embodiments to strike a balance between efficiency and accuracy.

Thus, the example detailed message correction algorithm described in this section may be characterized as follows for a K-layer LightGCN model (i.e. GNN 204):

The input to the message correction algorithm is a target node z, a training triple (u, t, n), the intermediate node embeddings $A^k E^{(0)}$ generated by layers 0 through K the LightGCN model (GNN 204), and the normalized adjacent matrix A.

The output of the message correction algorithm is a modified node embedding é$_z$ corrected for feature leakage.

The message correction algorithm proceeds as follows:

$$T \leftarrow \{e_z^{(0)}\}$$

for k←1 to K do:
   Compute $$\tilde{\Delta}_z^k$$

according to Equation (9);
According to Equation (7), compute $$\hat{A}_{z,*}^k E^{(0)} = |\mathcal{N}(z)| / |\hat{\mathcal{N}}(z)| \left( A_{z,*}^k E^{(0)} - \left( A_{z\vec{z}} A_{z,*}^{k-1} E^{(0)} + \tilde{\Delta}_z^k \right) \right);$$

$$T \leftarrow T \cup \left\{ \hat{A}_{z,*}^k E^{(0)} \right\}$$

Compute ê$_z$ by taking the mean of all the elements in T;
Return ê$_z$
This example message correction algorithm may efficiently evaluate the embeddings for z∈{u,t} in each triple (u, t, n). The same procedure can be repeatedly applied efficiently for all the triples in a mini-batch 302, because all of the triples can reuse the same input. Although Equation (9) is dependent on $$\hat{A}_{z,*}^{k-2} E^{(0)},$$

this value should already be computed from an earlier iteration at the time of evaluating $$\hat{A}_{z,*}^k E^{(0)}.$$

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, comprising:

training a graph neural network based recommender system to make recommendations in respect of a bipartite graph, the training including:

(i) receiving a mini batch comprising a plurality of training triples, each training triple comprising a user node of the bipartite graph, a positive item node having an edge connecting the positive item node to the user node, and a negative item node not having an edge connecting the negative item node to the user node;

(ii) for each training triple, processing the training triple and the bipartite graph to generate, using a graph neural network:

a user node embedding;

a positive item node embedding; and a negative item node embedding; and (iii) for each training triple, modifying, using a message correction algorithm, the user node embedding and the positive item node embedding generated by the graph neural network, comprising:

processing the training triple, using the graph neural network, to further generate one or more intermediate user node embeddings, and one or more intermediate positive item node embeddings;

applying a first function to the one or more intermediate user node embeddings generated by the graph neural network to generate a first output of the first function;

applying a second function to a final user node embedding generated by the graph neural network and the first output of the first function to generate a modified user node embedding;

applying the first function to the one or more intermediate positive item node embeddings generated by the graph neural network to generate a second output of the first function; and applying the second function to a final positive item node embedding generated by the graph neural network and the second output of the first function to generate the modified positive item node embedding;

wherein the first function is a linear combination function, and the second function is a subtraction function, wherein the graph neural network including the modified user node embedding and the modified positive item node embedding is used to make one or more recommendations for a user based on positive items that the user has previously interacted with.

2. The method of claim 1, further comprising:

processing the modified user node embedding, the modified positive item node embedding, the negative item node embedding, and the bipartite graph to compute a loss function.

3. The method of claim 2, further comprising:

processing the loss function and the graph neural network to adjust a plurality of learnable parameters of the graph neural network.

4. The method of claim 1, wherein:

the message correction algorithm modifies the user node embedding and the positive item node embedding in parallel.

5. The method of claim 1, wherein:

the first function and second function are selected based on an architecture of the graph neural network.

6. The method of claim 1, wherein:

the message correction algorithm generates the modified user node embedding and the modified positive item node embedding by correcting for feature leakage.

7. The method of claim 1, wherein:

the message correction algorithm generates the modified user node embedding and the modified positive item node embedding by approximating a correction for feature leakage.

8. A system comprising:

one or more processor devices; and a memory storing instructions which, when executed by the one or more processor devices, cause the system to train a graph neural network based recommender system to make recommendations in respect of a bipartite graph, the training including:

(i) receiving a mini batch comprising a plurality of training triples, each training triple comprising a user node of the bipartite graph, a positive item node having an edge connecting the positive item node to the user node, and a negative item node not having an edge connecting the negative item node to the user node;

(ii) for each training triple, processing the training triple and the bipartite graph to generate, using a graph neural network:

a user node embedding;

a positive item node embedding; and a negative item node embedding; and (iii) for each training triple, modifying, using a message correction algorithm, the user node embedding and the positive item node embedding generated by the graph neural network, comprising:

processing the training triple, using the graph neural network, to further generate one or more intermediate user node embeddings, and one or more intermediate positive item node embeddings;

applying a first function to the one or more intermediate user node embeddings generated by the graph neural network to generate a first output of the first function;

applying a second function to a final user node embedding generated by the graph neural network and the first output of the first function to generate a modified user node embedding;

applying the first function to the one or more intermediate positive item node embeddings generated by the graph neural network to generate a second output of the first function; and applying the second function to a final positive item node embedding generated by the graph neural network and the second output of the first function to generate the modified positive item node embedding;

wherein the first function is a linear combination function, and the second function is a subtraction function, wherein the system uses the graph neural network including the modified user node embedding and the modified positive item node embedding to make one or more recommendations for a user based on positive items that the user has previously interacted with.

9. The system of claim 8, further comprising:

processing the modified user node embedding, the modified positive item node embedding, the negative item node embedding, and the bipartite graph to compute a loss function.

10. The system of claim 9, further comprising:

processing the loss function and the graph neural network to adjust a plurality of learnable parameters of the graph neural network.

11. The system of claim 8, wherein:

the message correction algorithm modifies the user node embedding and the positive item node embedding in parallel.

12. The system of claim 8, wherein:

the first function and second function are selected based on an architecture of the graph neural network.

13. A non-transitory computer-readable medium having instructions tangibly stored thereon that, when executed by a processor, cause the processor to perform the method of claim 1.

14. The system of claim 8, wherein:

the message correction algorithm generates the modified user node embedding and the modified positive item node embedding by correcting for feature leakage.

15. The system of claim 8, wherein:

the message correction algorithm generates the modified user node embedding and the modified positive item node embedding by approximating a correction for feature leakage.

* * * * *